No. 790,486.

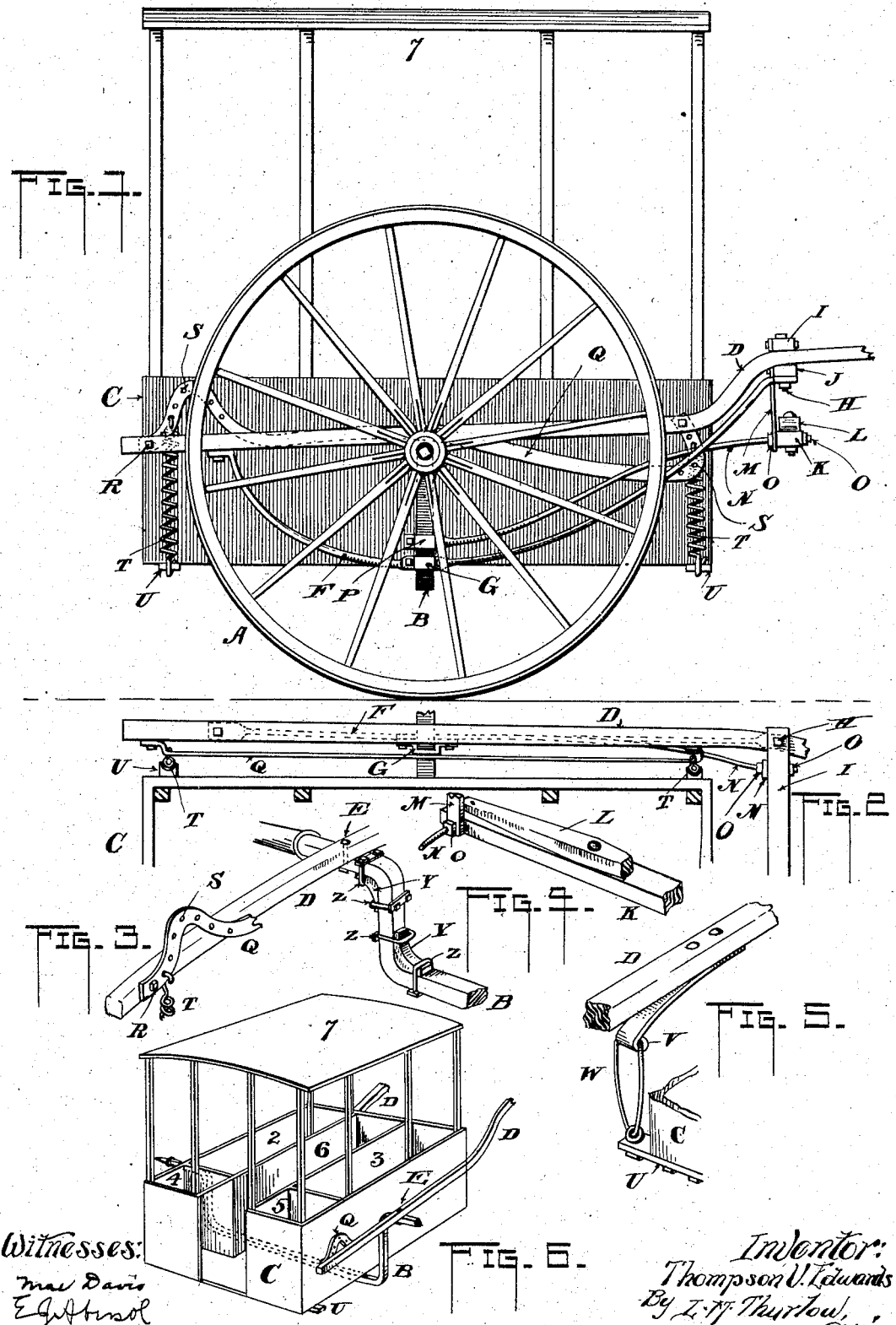

Patented May 23, 1905.

UNITED STATES PATENT OFFICE.

THOMPSON V. EDWARDS, OF PEORIA, ILLINOIS, ASSIGNOR OF ONE-HALF TO DON CARLOS EMERSON, OF PEORIA, ILLINOIS.

TWO-WHEELED VEHICLE.

SPECIFICATION forming part of Letters Patent No. 790,486, dated May 23, 1905.

Application filed September 3, 1904. Serial No. 223,185.

*To all whom it may concern:*

Be it known that I, THOMPSON V. EDWARDS, a citizen of the United States, residing at Peoria, in the county of Peoria and State of Illinois, have invented certain new and useful Improvements in Two-Wheeled Vehicles; and I do hereby declare that the following is a full, clear, and exact description of the invention, which will enable others skilled in the art to which it appertains to make and use the same.

This invention has reference to improvements in two-wheeled carts of that class employed by mail-carriers, milk or dairy men, and kindred other uses.

The invention has especial reference to means for making the cart more easy riding than these vehicles as ordinarily constructed.

It has reference also to the gearing employed for improving the general "make-up" and prolonging the life of the vehicle.

The object of the invention, therefore, is to improve this class of vehicles by making it more easy riding and providing an adjustment of the carrying-springs to suit various loads carried and, furthermore, to considerably lessen the "horse motion" usually present in two-wheeled carts.

In the drawings forming part of this application, Figure 1 is a side elevation of my improved cart. Fig. 2 is a plan view of a portion of the cart, showing certain features thereof. Fig. 3 is a perspective view of a portion of one of the shaft members, showing an adjusting means for a spring. Fig. 4 is a perspective view of a swingletree, showing a supporting-bar therefor. Fig. 5 is a perspective view of a portion of a shaft member, illustrating a modified form of spring for supporting the body of the cart. Fig. 6 is a perspective view of an improved cart-body to be described in the following specification.

A in the drawings indicates the vehicle-wheel, supporting by its mate (not shown) the axle B in form of a U, as indicated in Fig. 6, the upper limbs of which extend outward from the vehicle-body, (shown at C.) The shafts D are secured to the said outwardly-extending portions of the axle on which the wheels are carried, said shafts being secured to the axle by means of bolts E, Figs. 3 and 6. At F is a U-shaped member, one end of which is bolted to the shaft near its rear end, the forward end of said member F being bolted to the shaft forward of the body C by means of the bolt H, there being two transverse braces on the shaft, (indicated by I and J,) above and below the shaft, respectively, through which said bolt H extends, the braces being used to stiffen the shafts, as will be understood. The lowermost portion of the member F lies adjacent to the axle and is clamped thereto by means of a clip G, and thus stiffens the shaft and holds it rigid with the axle.

Just below the brace J, just referred to, is hung a brace K, which supports the swingletree L, said brace being held in position by means of depending iron straps M, but one of which is shown in the drawings. This places the swingletree at the proper height for the horse, and said brace M is braced by means of a rod N, threaded at its forward end and projecting through said brace horizontally and provided with nuts O O, the rear end of the rod being clamped to the axle at P in a manner similar to that just described for the rod member F. Now an irregularly-formed bar Q is provided inside each shaft member, one being secured by a bolt R to near the rear end of the shaft and its forward end also to the shaft somewhere behind the swingletree L, but considerably forward of the axle. This said bar Q is bent up into the form of an inverted U just forward of its bolt R and is provided with a series of holes S. At the opposite end the bar is bent downward from its sustaining-bolt R and also provided with holes. At T T are springs of the spiral form, one end engaging with one of the holes in the bar Q, while the lower ends of the springs engage with members U, secured to the under side of the bottom of the body C. It will now be observed that the said body is suspended on the springs and is free to move vertically while hanging therefrom. If the load carried in the body, together with the weight of the body itself, is too great for the springs, so as to permit the body to touch or bump upon the axle beneath, the said springs may be raised into holes higher up, thus permitting plenty of latitude.

While I have described the shape of the bar Q, other shapes thereof may be used with equally good results, as I do not wish to confine myself to any particular structure therein. Furthermore, I may change the other parts of the cart as to the braces and the like and as to their places of connection. With regard to the springs T, it is desired to state that other forms may be used—as, for instance, as shown in Fig. 5, in which a flat spring V is employed, being secured at one end to the shaft, the free end having an eye for supporting a loop W for attachment to the said member U, as before. With regard to the axle B, I show in Fig. 3 means for strengthening it, if desired. This consists in placing in the corners thereof a block Y, clamped in position by means of the clips Z, as shown. This greatly strengthens said axle and prevents springing the same, thus permitting it to be made of light material to reduce the cost of manufacturing the vehicle.

I show in Fig. 6 my improved form of cart-body, which comprises a box open at the rear for entrance of the passenger, said box being also divided into compartments 2, 3, 4, and 5 with a passage 6 for convenience in reaching said compartments. A canopy 7 is provided to cover the whole, thus making a complete and convenient storm-proof conveyance when supplied with side curtains.

I claim—

1. In a two-wheeled cart, the wheels thereof, a U-shaped axle therefor hanging between the wheels, the shafts secured to the axle adjacent to the wheels, the cart-body hanging partially between the wheel-hubs, a member formed in an irregular curve secured to each limb of the shafts forward of and rearward of the axle substantially as shown, a spiral spring at each corner of the cart-body and adjustably secured to the said members and to the cart-body, and a brace-rod attached at one end to each shaft-limb forward of the axle, and attached also to the axle near its lower portion and secured at its rear end to the shaft-limb behind the axle.

2. In a two-wheeled cart the wheels, the U-shaped axle hanging between the wheels, the cart-body hanging within the axle, the shafts attached to the axle adjacent to the wheels, a member at each side of the cart, the same being formed in an irregular curve and attached to one end to the shaft forward of the axle and to the shaft rearward of said axle as shown, a spiral spring at each corner of the body and by which the latter is suspended, said spring being hung from the members described and adjustable thereon as and for the purposes set forth, a brace-rod attached to each shaft-limb and extending downward and rearward to the axle to which it is attached and then upward and rearward and secured to the rear end of said shaft-limb, a horse attachment hung from the shafts, and a brace attached to the axle and extending forward to rigidly hold the said draft attachment through which the pull on the latter is transmitted to the axle.

3. In a two-wheeled cart the wheels, the U-shaped hanging axle, the shaft attached to the axle adjacent to the wheels, the cart-body hung between the wheels, a member secured to each shaft-limb forward of the axle and extending downward and rearward below the shaft, then upward above the shaft and downward and connected to said shaft-limb as shown, there being a series of holes in the forward and rearward extremities of said members, a spiral spring attached to each corner of the cart-body and suspended from certain of the holes in the members, a brace-rod secured to each shaft-limb and extending downward and rearward to the axle to which it is connected, thence extending rearward and upward and attached to the shaft-limb, a draft attachment suspended below the shafts and a brace secured to the axle and extending forward and terminating at the draft attachment for holding the same rigid and for transmitting the pull of the horse directly to the axle.

4. A two-wheeled cart comprising the wheels and axle, the shafts secured to the axle and extending forward and rearward therefrom, a member secured to each shaft member on the inside thereof, the cart-body suspended between said first-described members, springs adjustably secured to the said members and from which the cart-body is hung, substantially as shown, a brace suspended below the shafts forward of the cart-body, a rod attached to the axle at one end and at its other end to said brace and a swingletree carried by said brace substantially as described.

5. A two-wheeled vehicle comprising the wheels, the shafts carried between them, the axle to which the shafts are secured, the members carried on the inside of the shafts, the cart-body suspended between the members, the springs attached to the members and having the body suspended from the springs, the brace-rod attached to the rear of the shaft and also to the axle and at its forward end to the shafts, the transverse brace suspended from the shafts forward of the cart-body, and the brace-rod connected thereto and to the axle all being arranged substantially as and for the purposes indicated.

In testimony whereof I affix my signature in presence of two witnesses.

THOMPSON V. EDWARDS.

Witnesses:
MARY E. CULVER,
L. M. THURLOW.